Dec. 22, 1970     T. HINDLE     3,548,468
MACHINES FOR FINISH PROCESSING OF ENDLESS FELTS
Filed Nov. 13, 1968     17 Sheets-Sheet 1
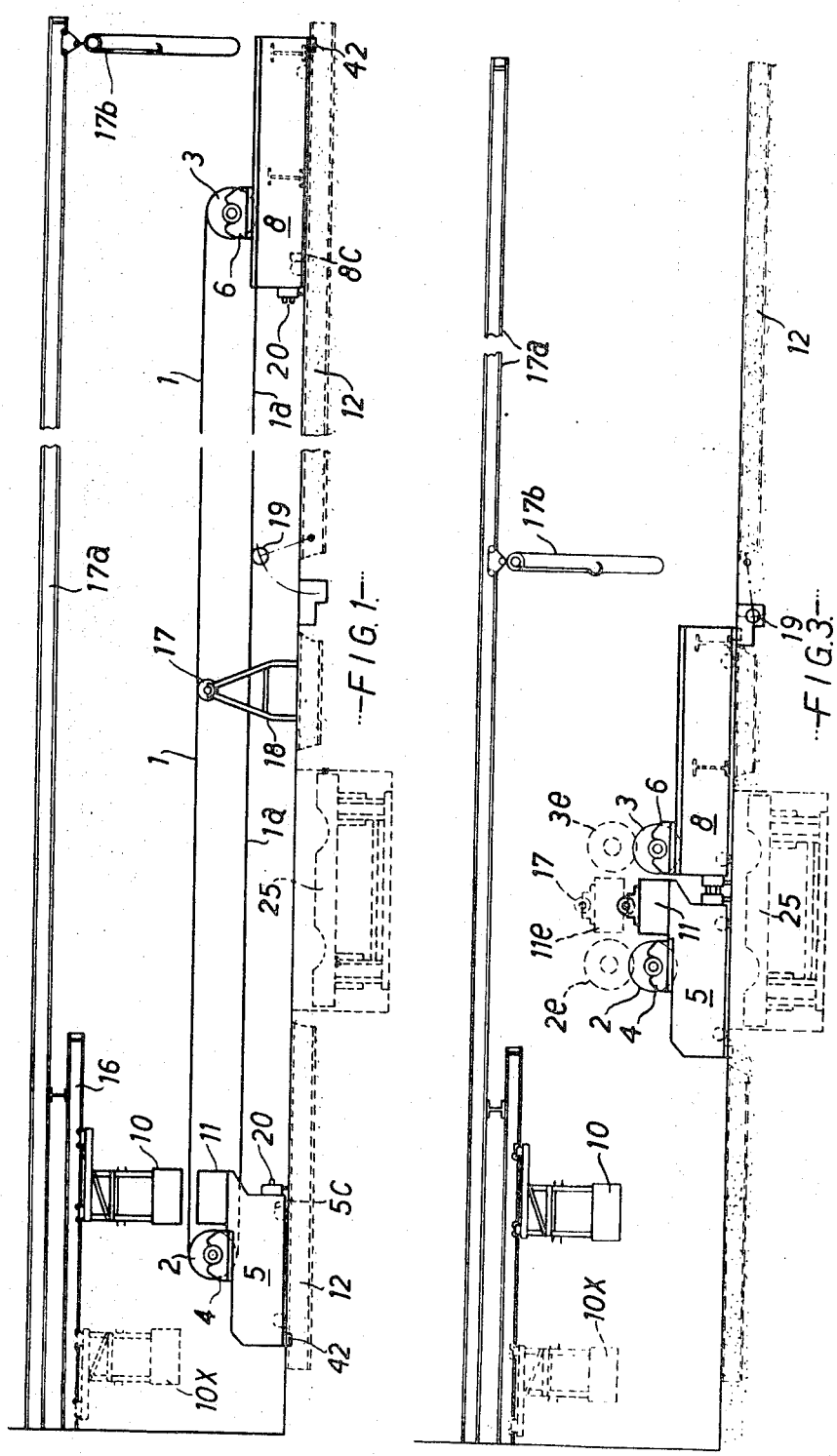
INVENTOR:
Thomas Hindle
by Roberts, Cushman & Grover
Attorneys

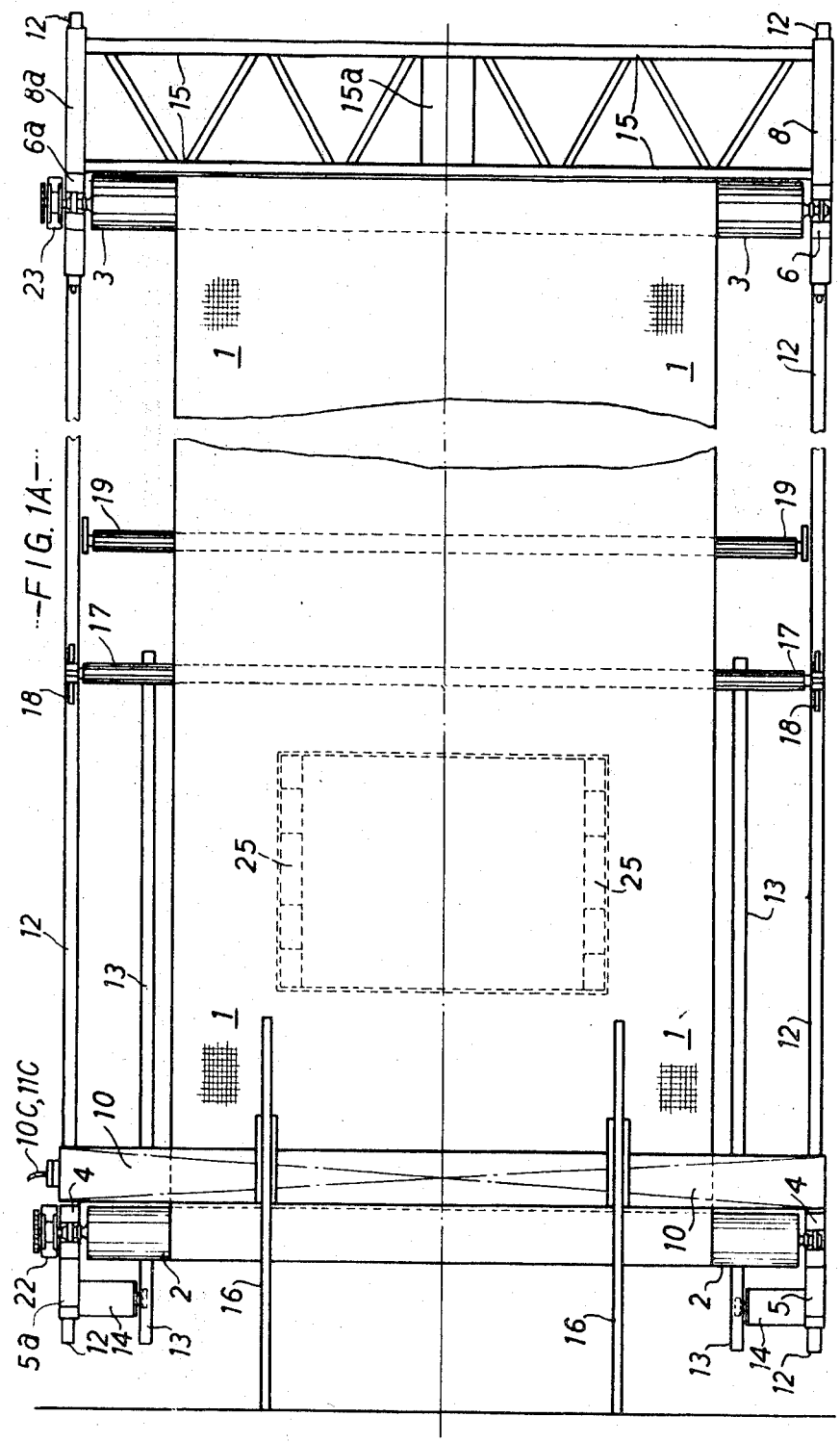

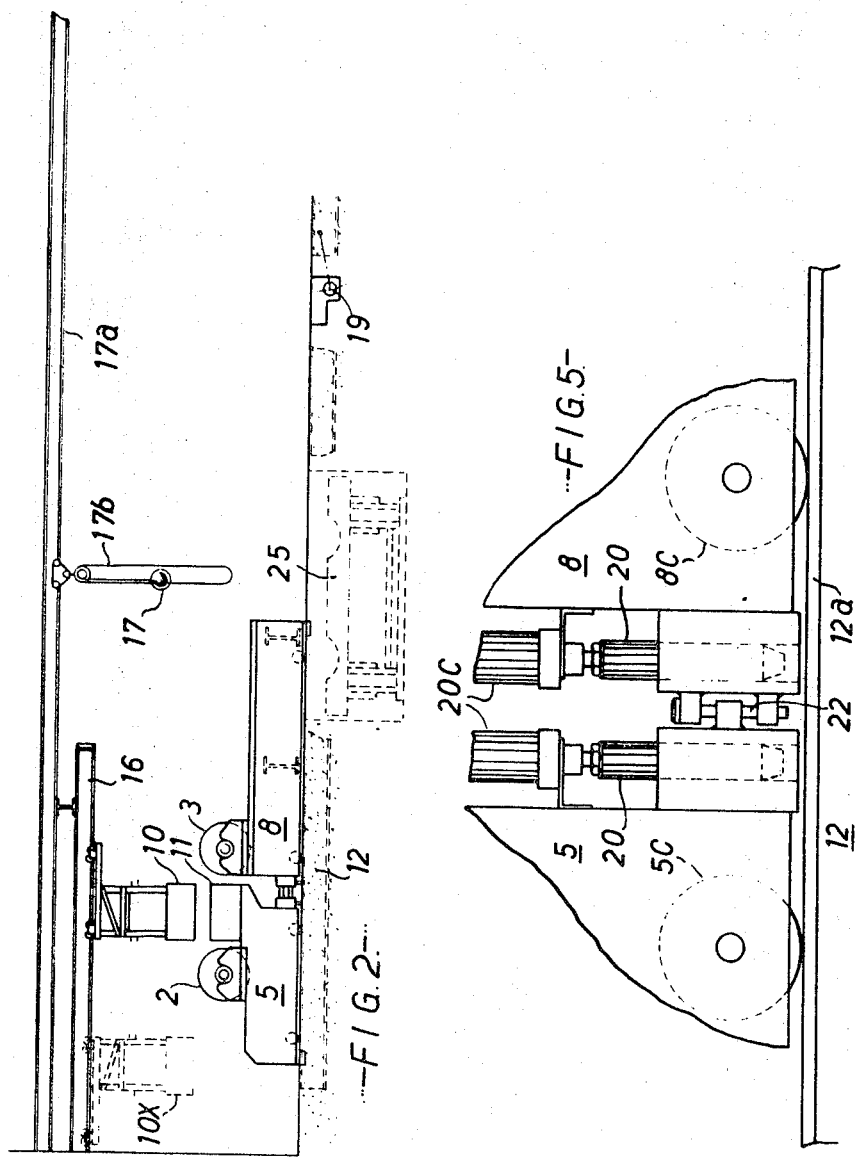

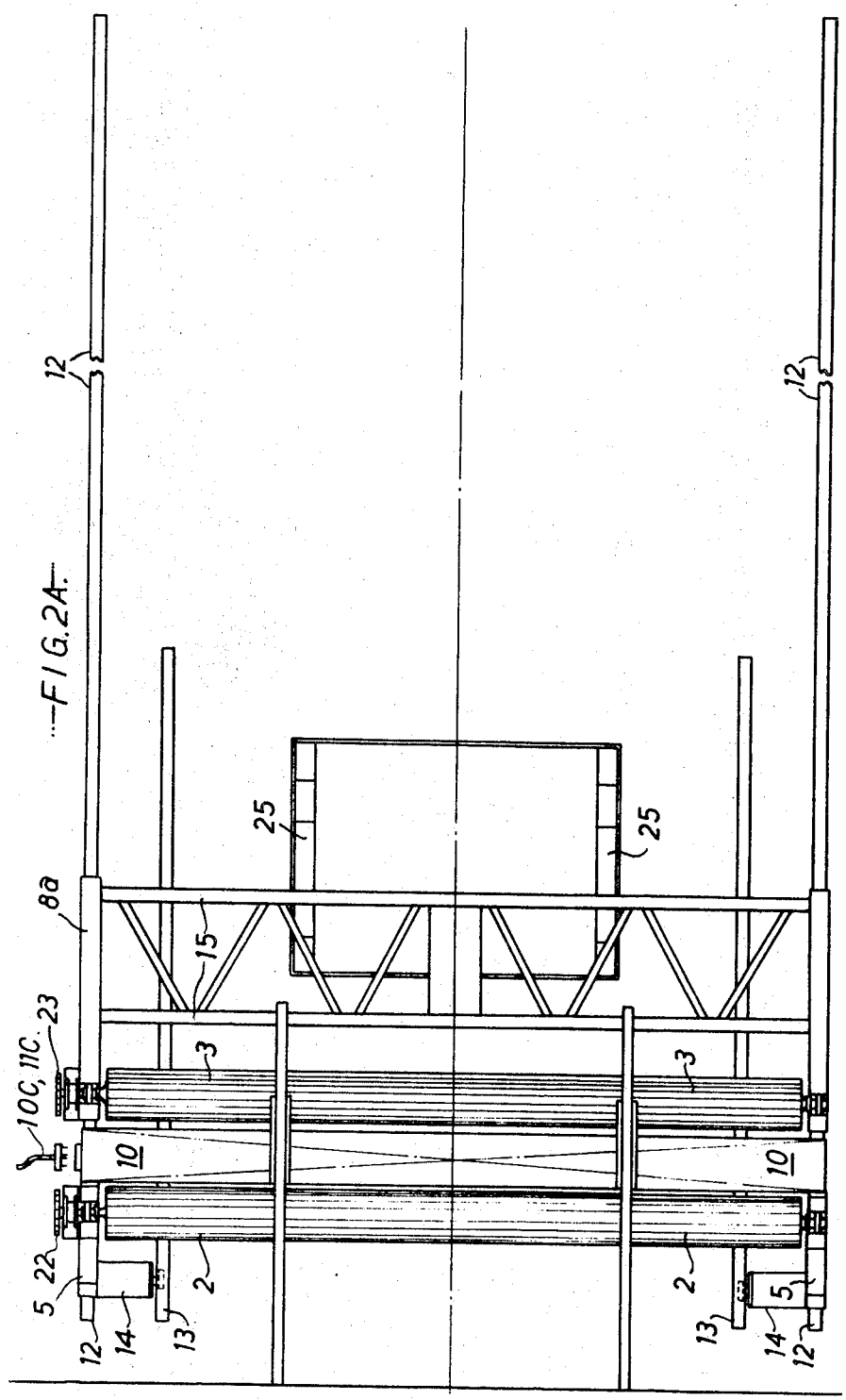

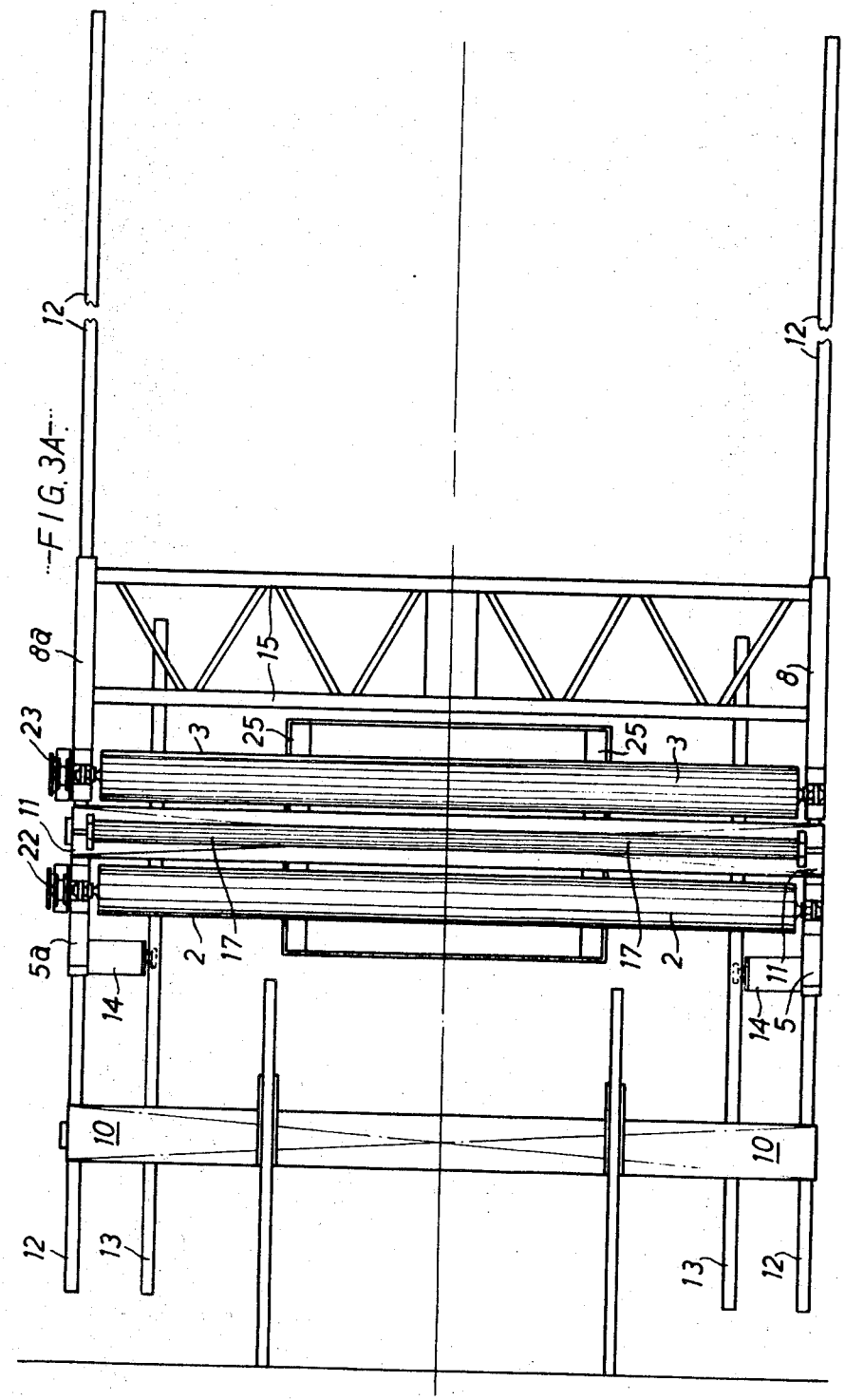

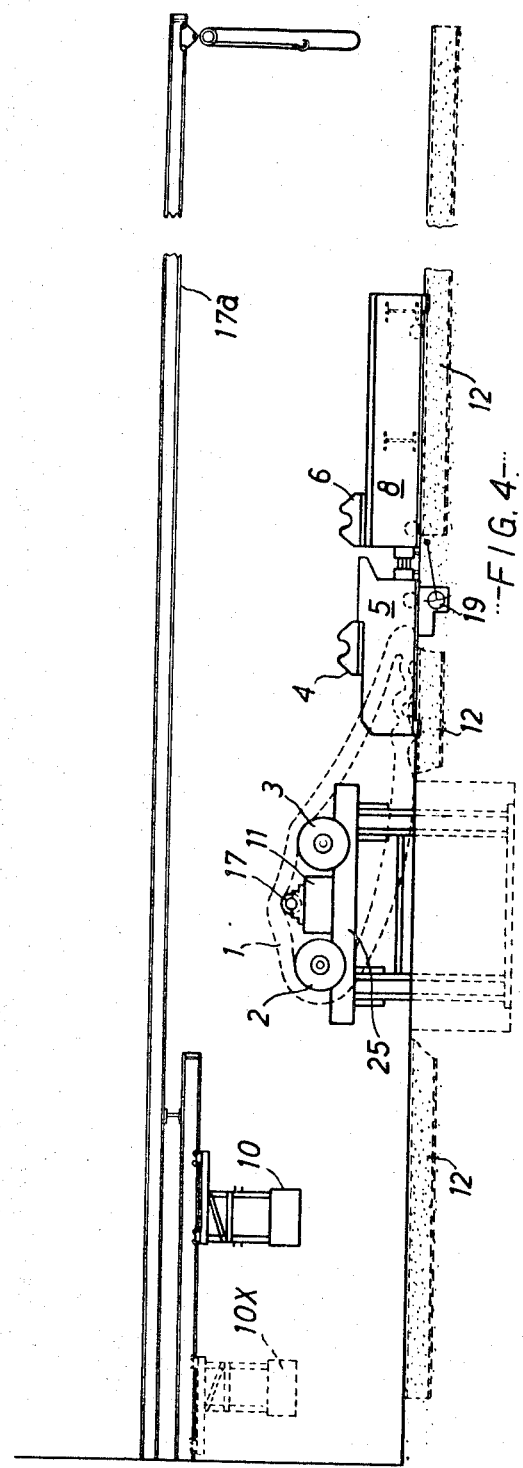

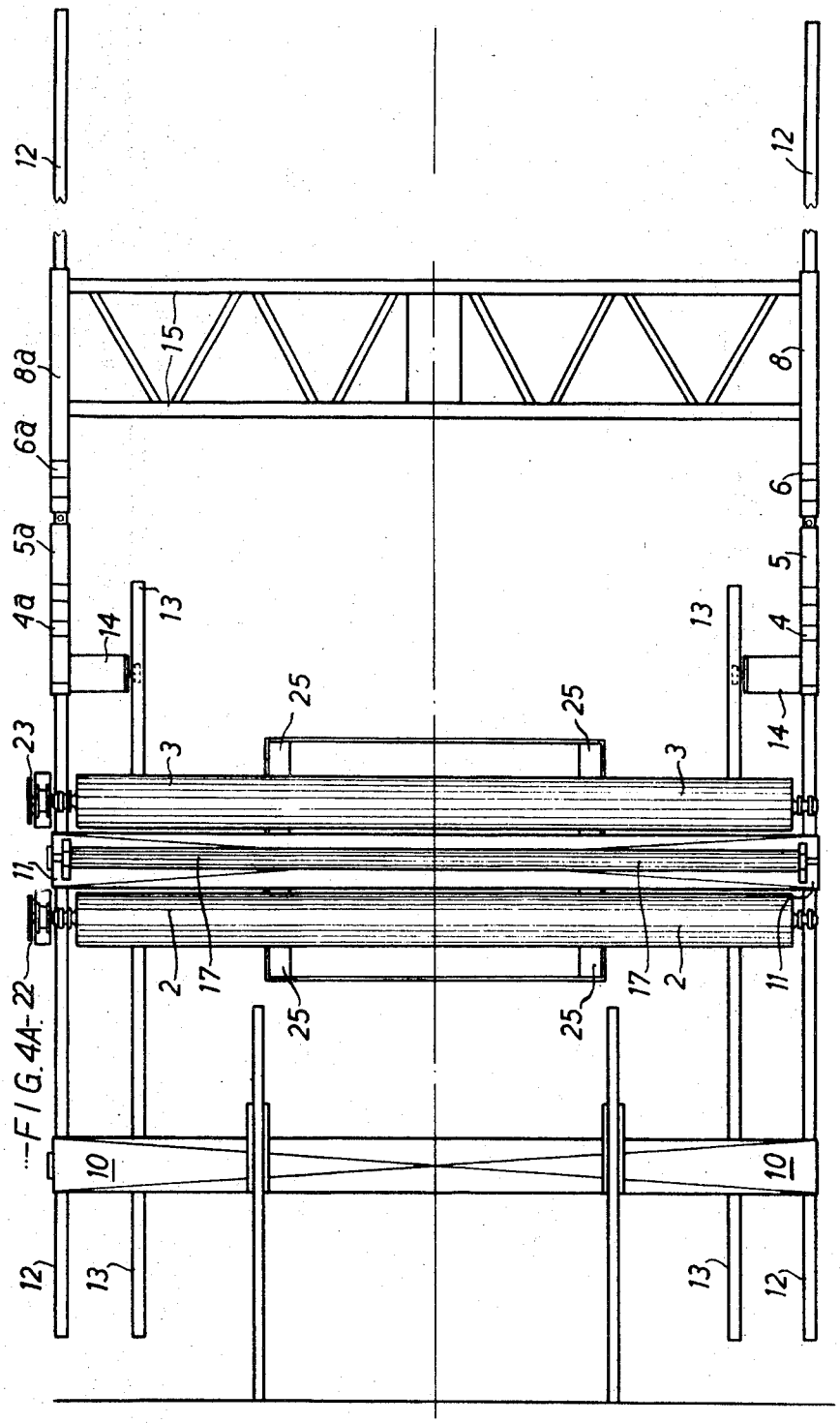

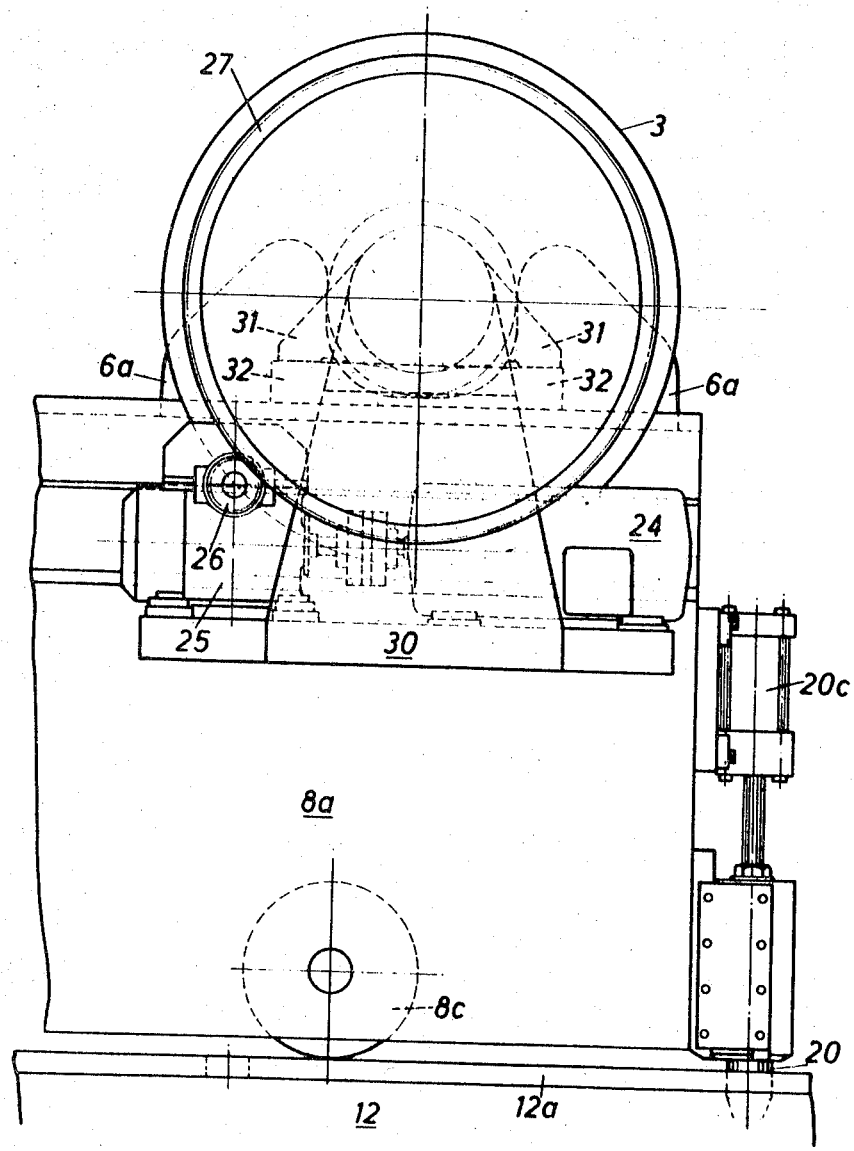

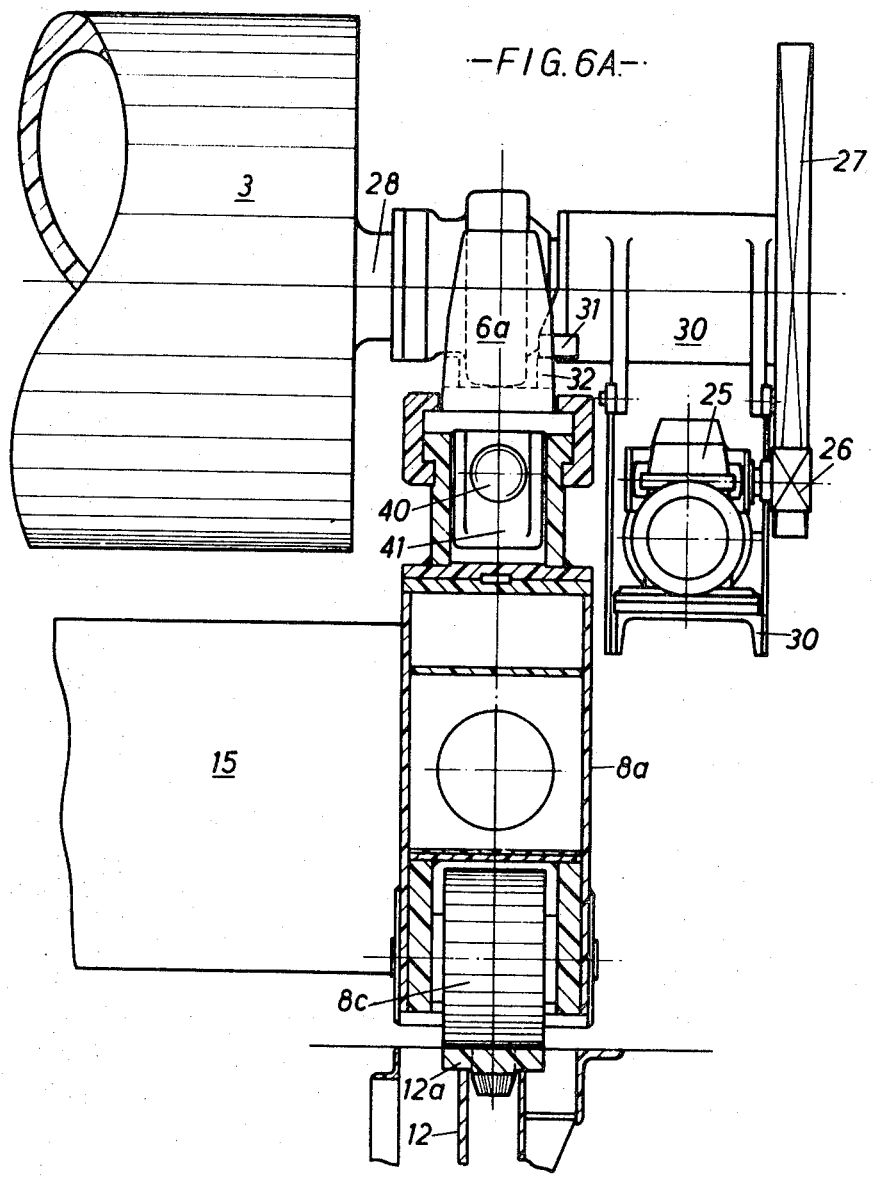

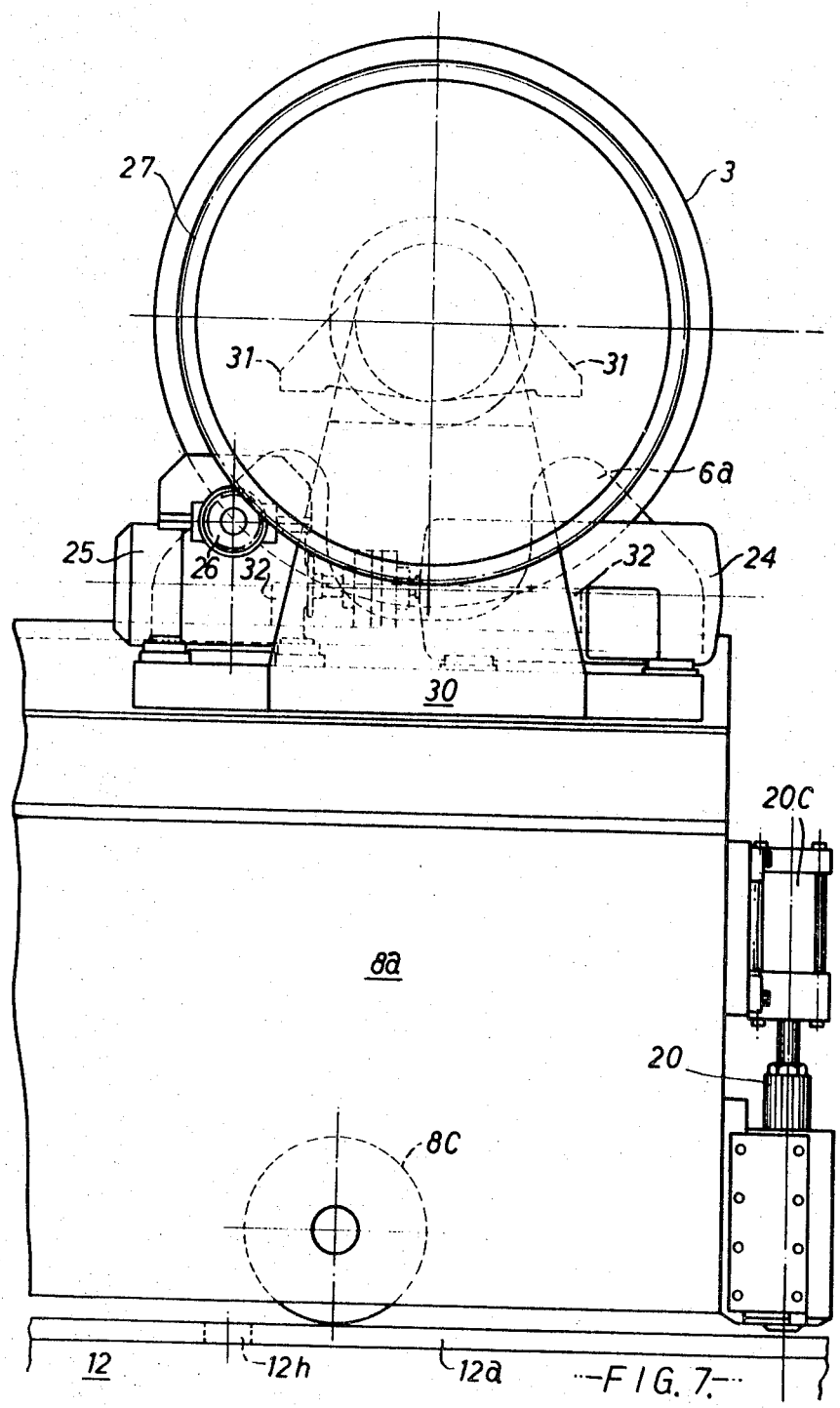

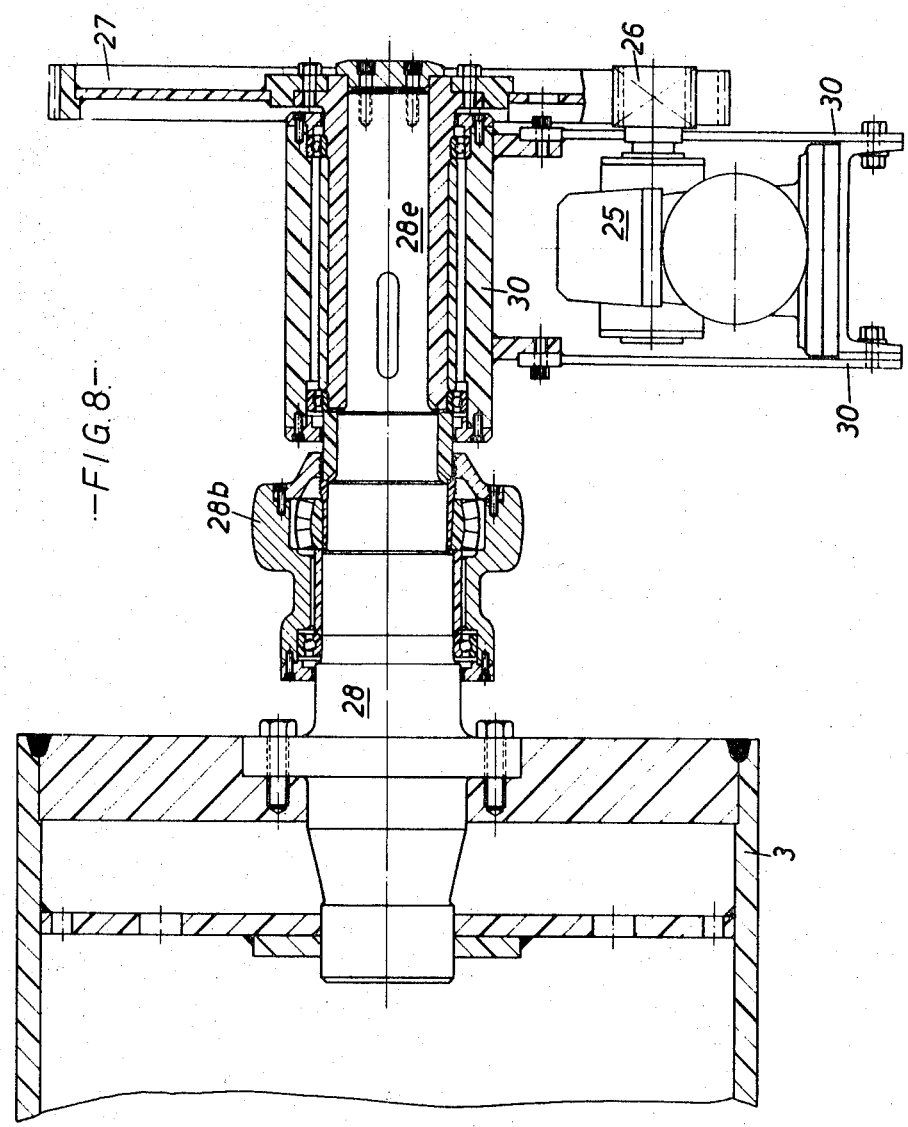

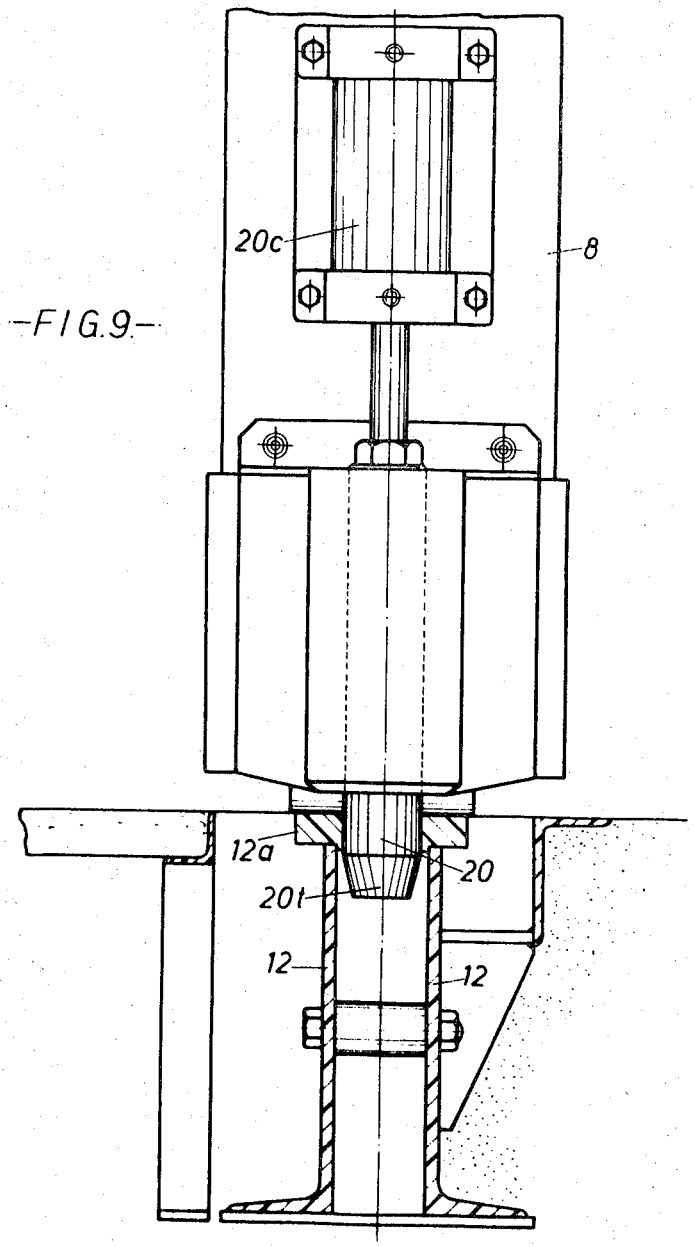

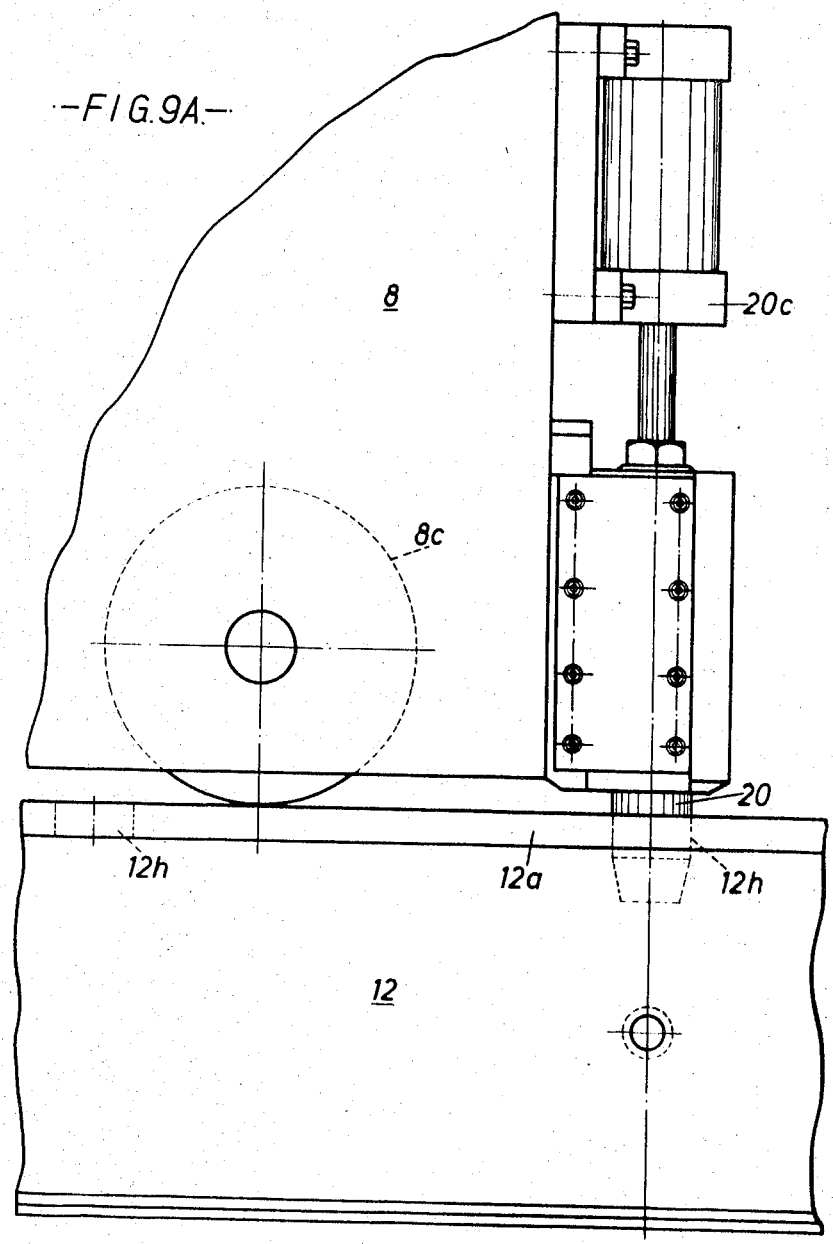

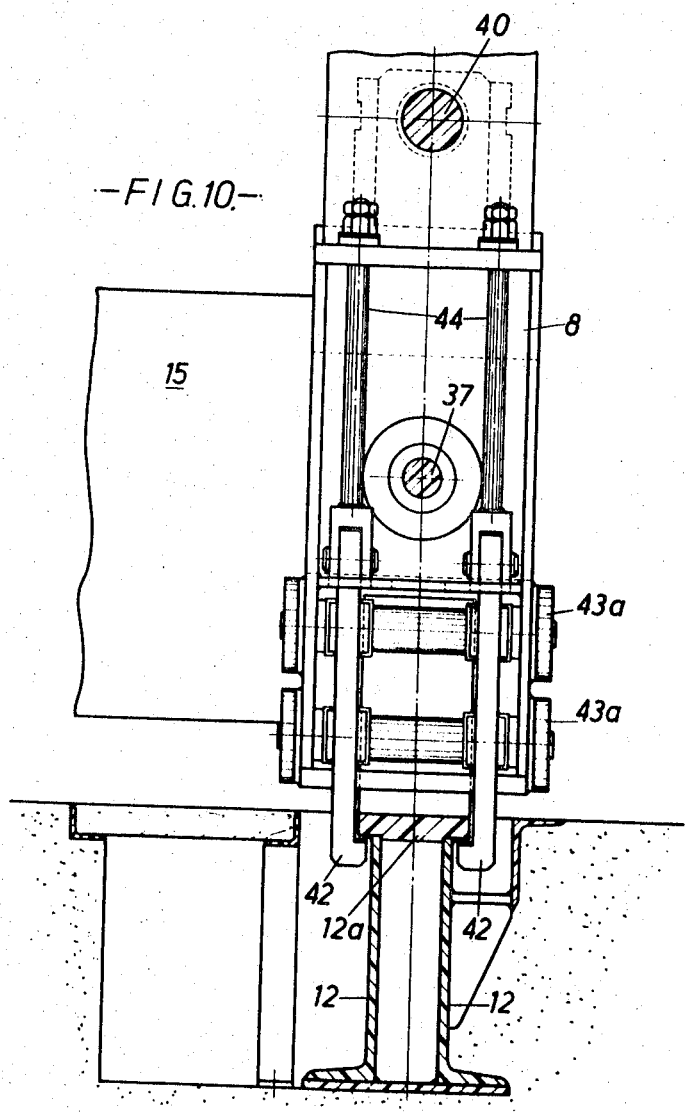

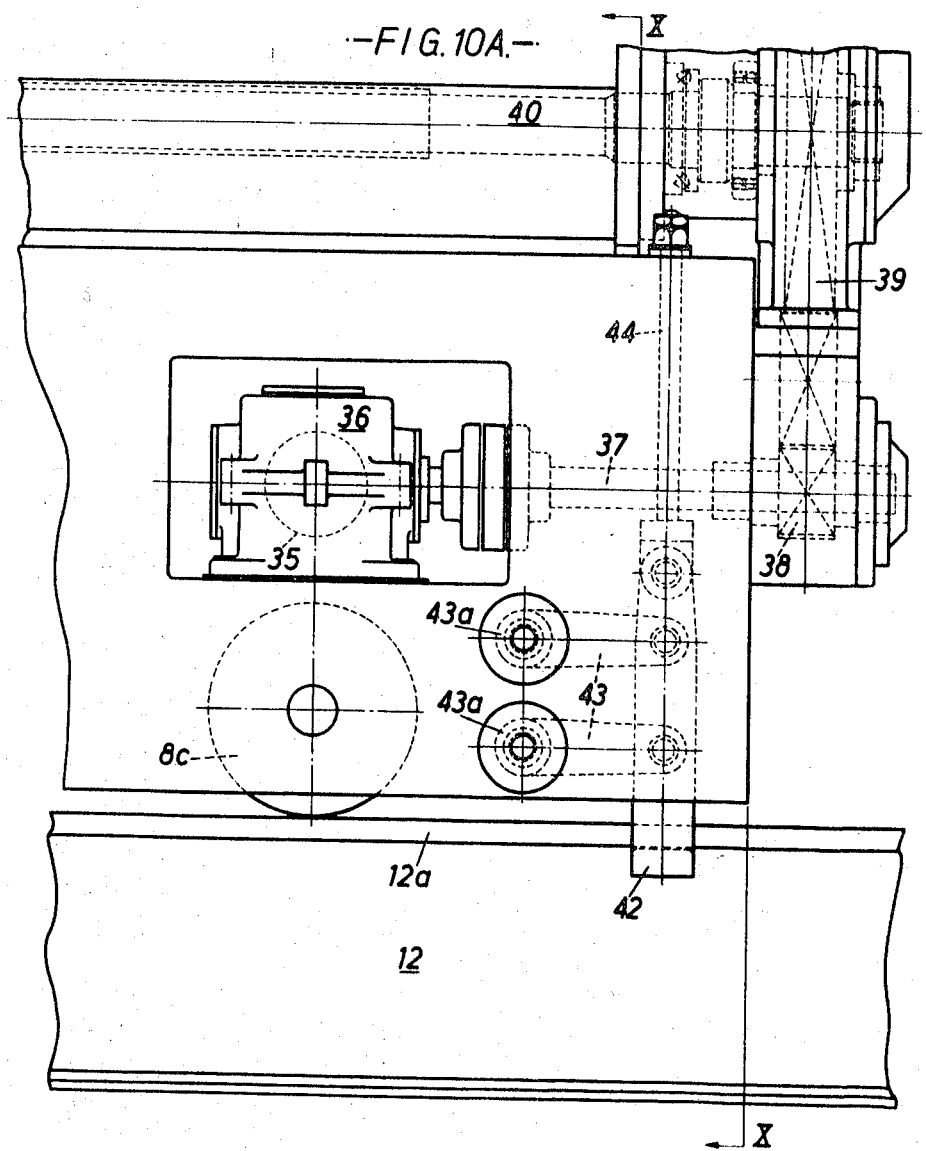

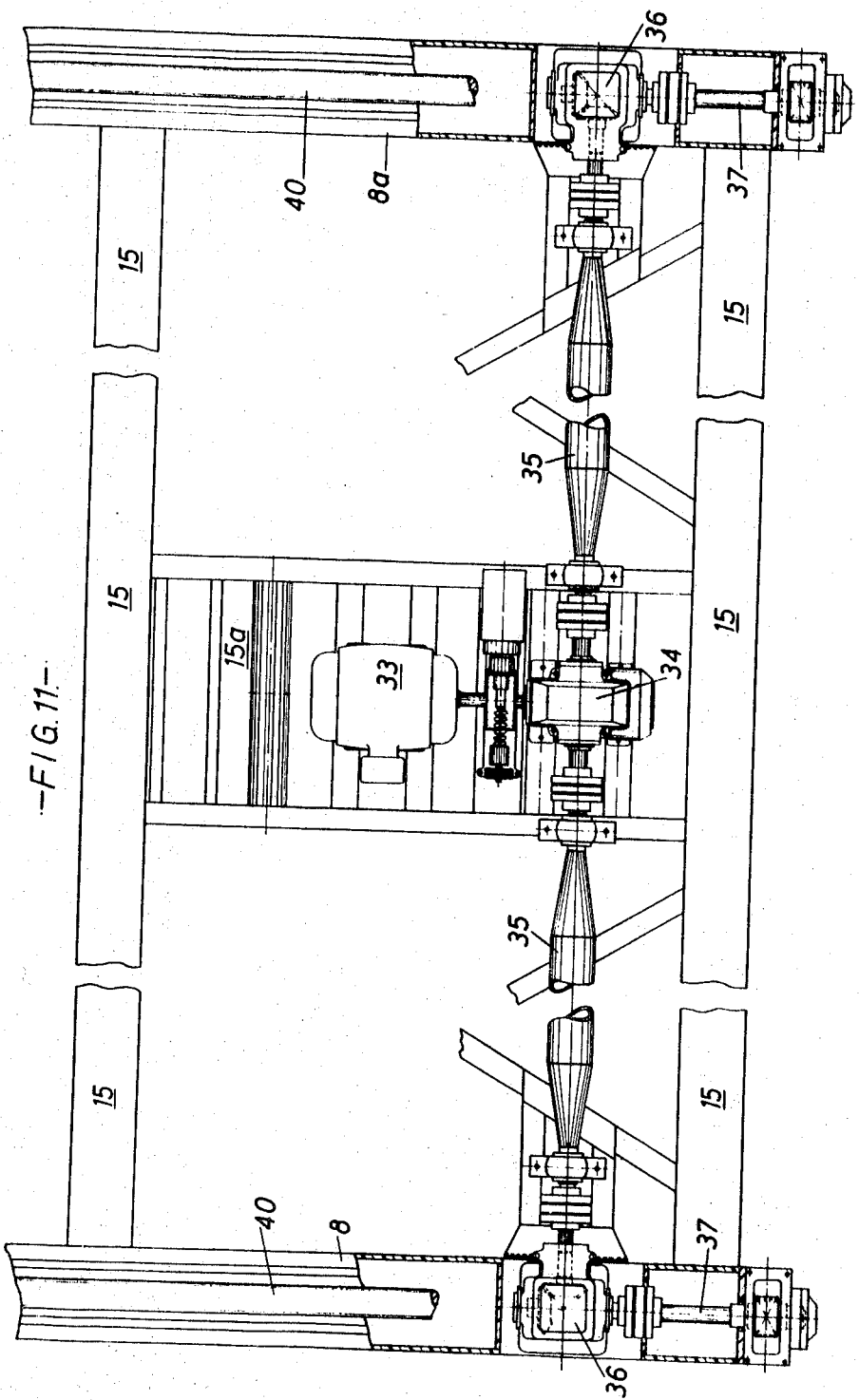

United States Patent Office 3,548,468
Patented Dec. 22, 1970

3,548,468
MACHINES FOR FINISH PROCESSING OF ENDLESS FELTS
Thomas Hindle, Blackburn, England, assignor to Hindle, Son and Company Limited, a company of the United Kingdom of Great Britain and Northern Ireland and the Isle of Man
Filed Nov. 13, 1968, Ser. No. 775,470
Claims priority, application Great Britain, Nov. 14, 1967, 51,667/67
Int. Cl. D02j 3/02
U.S. Cl. 26—68                                    6 Claims

ABSTRACT OF THE DISCLOSURE

A machine for the finish processing of felts wherein two carriages each carrying a respective roller are movable, one relative to the other, between a first position whereat the rollers are in adjacent disposition for the loading of an endless felt thereonto or for removal of a felt therefrom. A heater means is provided to apply heat to both sides of the felt. To facilitate the removal of the felt from the rollers, such rollers are mounted in bearings from which they can be lifted, an appropriate lifting means being provided for this purpose.

---

This invention relates to improvements in machines for use when carrying out certain finishing processes on papermakers' felts and the like, which in the main are endless fabrics of unusual width, composed of animal, vegetable or manmade textile materials, either singly or in any preferred admixture. Such processes include, for example, stretching, drying, curing resinous impregnations, and heat-setting.

The fabric of wet felts, also certain forms of dry felts, may be "woven flat" to a suitable width and length, with extending warp fringes which are then utilized to splice the ends of the fabric together so as to form an endless band; or alternatively, the fabric may be "woven round," i.e., woven in the form of an endless band, similar to the weaving of fire hose, but on a much larger scale.

Whichever method of manufacture be adopted, however, such felts are already in the endless band form when they undergo their final finishing processes, consequently the machine to be used in carrying out those processes must be contrived so as to permit and indeed facilitate the loading of such endless felts, and subsequently, of course, their unloading, preferably all with a minimum of manual exertion.

For the finishing of an endless felt, it is well-known practice to extend the felt horizontally between four or more rollers, or cylinders, some of which have fixed locations while others are adapted to move away as necessary to extend the felt and develop therein the specified stretching tension. In known practice, the fixed rollers are heated by steam or hot-oil circulation. When heated in such manner, however, the rollers cannot readily be quickly cooled, and consequently the operations of loading and unloading endless felts in reasonably rapid succession present obvious difficulties for the machine operators. Furthermore, a felt is liable to be seriously damaged if any part of it is allowed, even momentarily, to rest on the periphery of a hot roller in the course of the loading operation.

In general practice, even more than four main rollers may be employed, in order to reduce the overall length of the machine, and also to reduce the lengths of the horizontal and unsupported felt runs, but the task of loading an endless felt over any such greater number of rollers inevitably increases the complexity of that operation.

The use of a multiplicity of stretching rollers has the further grave disadvantage that the deflection of every such roller, under the bending load imposed by the tensioned felt, is additive so far as the felt is concerned, and results in the finished felt having a shorter length when measured along its longitudinal centre-line than at its edges. Such dimensional irregularities are prejudicial to the felts' subsequent performance on the papermaking machine.

For the above reasons, when considering a machine for processing the widest wet felts, which do not normally exceed 120 feet in length, it is preferred to limit the number of main stretching rollers to two, at the same time making them of relatively large diameter in order to minimise their deflection under load, and to support the horizontal runs of the felt extended between the two main rollers by suitable carrier rolls which serve to prevent objectionable sag.

According to the present invention a machine for the finish processing of endless felts or like structures includes a first main roller rotatably mounted in fixed bearing means, a second main roller arranged in spaced parallel disposition relative to the said first main roller, a mounting means to support the said second main roller in such disposition, the said mounting means being adapted to be adjustable in position relative to a fixed support so as to vary the separation of the first and second main rollers as required, and heater means adapted and arranged, at a suitable location in the felt run, to apply heat to both sides of a felt or like structure extending around and supported by the said rollers.

According to a further feature of the invention the machine also includes a lifting means engageable with the first and second rollers and adapted to lift same from the respective mounting means therefor thus to provide access to such rollers in the axial direction thereof for the application thereto or removal therefrom of an endless felt.

Preferably, the fixed bearing means whereby the first main roller is supported is mounted on a first carriage movable on guide tracks, and the said fixed support comprises a second carriage which is movable relative to the first said carriage on the same or different tracks and to a position adjacent thereto. In such an arrangement the lifting means is operable simultaneously on both main rollers.

The heater means preferably comprises two superimposed heater boxes between which the slowly moving, tensioned felt passes, both heater boxes being mobile and adapted for limited horizontal movement.

In a preferred embodiment both heater boxes are adapted and arranged to apply infrared radiation to the said felt.

The end bearings of the rollers will usually be carried in open-top pillow-blocks out of which they are adapted to be lifted bodily, complete with self-contained driving units provided in respect of each such roller and together with the lower heater box, by the lifting means, which latter is in the form of a scissors lift or equivalent lifting mechanisms, thereby permitting the said pillow-blocks and their supporting carriages to be moved temporarily to one side out of the way.

In one arrangement the second carriage defines a mobile stretching carriage which includes spaced side members rigidly connected by a cross-framework whilst the first carriage includes twin carriages arranged in spaced side-by-side disposition, all three carriages being adapted to be coupled together and to move horizontally as one unit on guide rails. The rollers and the lower heater box are capable of being temporarily supported in an elevated position parallel to floor level by the scissors lift, or equivalent lifting mechanism, with their forward ends overhanging a platen of the lift, thereby permitting an endless felt to be loaded thereon, and subsequently to be unloaded therefrom, with relative ease and complete safety to the operators. Locking arrangements for the carriages are provided whereby such carriages are fixed in position on the guide rails, such locking arrangements comprising vertical bolts located at the adjacent ends of each carriage, such bolts, as and when required, being adapted to be lowered so as to engage holes or sockets provided at suitable intervals in the top flange of the guide rails.

Hook-bolts are provided at the rear ends of each carriage, which hook-bolts are adapted to engage the underside of top flanges of the guide rails, thereby preventing the rear ends of the carriages from any significant lifting or tilting action under the couple created by the tension of the felt.

The mobile stretching carriage is powered to travel in either direction along main rails, the top faces of the side members being formed into slides supporting open-top pillow-blocks to receive the second main roller adapted to travel in either direction along such slides by means of screw and nut mechanisms coupled together by suitable gearing and a cross-shaft and powered by an independent electric motor, the motor being controllable electronically to maintain any desired tension in the felt as it moves slowly while extended between rollers.

One or more carrier rolls will be provided to support the top run of the felt, such rolls being adapted to be mounted on V-blocks temporarily placed on top of the lower heater box, for the purpose of the loading or unloading operations, and to be lifted therefrom by lifting blocks and placed in sockets provided on A-frames located in any suitable manner on or alongside each guide rail. One or more carrier rolls will usually be provided to support the bottom run of the felt, such rolls being adapted to retreat into trenches in the floor to permit the passage of the mobile carriage, and to rise therefrom to, and remain at, a suitable height relative to the bottom run of the felt.

In the improved machine the subject of the present invention, the two main rollers, or cylinders are not directly heated either by steam or hot-oil circulation. They may acquire heat by their contact with the hot felt riding around them, but in general the rollers do not attain an undesirably high temperature. When however, the machine is being used for heat-setting (i.e., stabilising) a felt at high temperature, the rollers are liable to attain a temperature sufficiently high as to cause difficulty in the unloading of the finished felt. To provide for these extreme conditions, the improved machine may be equipped with means for cooling the rollers quickly, or for limiting their temperature rise during such heat-setting operation. This end may be achieved, for example, by utilising hollow rollers and by circulating cold water through such hollow rollers.

The necessary heat for processing purposes is provided by two or more heater boxes. These preferably contain a series of horizontally disposed rod-like resistive elements which when electrically heated to the appropriate surface temperature emit infrared heat rays. The rays from the upper box or boxes are directed substantially downwards onto the upper side of the felt, and those from the lower box are directed substantially upwards onto the lower side of the felt. The horizontal elements in these two boxes, between which the tensioned felt slowly passes without contact, are separated from the felt by some ten inches, and their radiant heat brings it up to the temperature appropriate for the particular process to be carried out.

The invention will now be described further, by way of example only, with reference to the accompanying drawings illustrating one embodiment thereof and in which:

FIG. 1 is an elevation from the felt-loading side of the machine showing the various components in the relative positions they occupy when actually processing an endless felt;

FIG. 1A is a plan view corresponding to FIG. 1;

FIG. 2 is a view similar to FIG. 1 and shows the first operation in preparation for the unloading of the finished endless felt;

FIG. 2A is a plan view corresponding to FIG. 2;

FIG. 3 is a view similar to FIG. 2 and shows a second operation in the preparation for the unloading;

FIG. 3A is a plan view corresponding to FIG. 3;

FIG. 4 is an elevation, again from the felt loading side of the machine, showing the third and final operation, and the various components in the relative positions they occupy when unloading a finished felt, or conversely when loading a felt, in readiness for processing;

FIG. 4A is a plan view corresponding to FIG. 4;

FIG. 5 is a detail, drawn to a larger scale, of one form of linkage for temporarily coupling the twin carriage to the mobile stretching carriage;

FIG. 6 is a side elevation of the mobile stretching roller and its self-contained driving unit, both shown in the down positions with the bearings resting in their open-top pillow-blocks;

FIG. 6A is a rear elevation corresponding to FIG. 6;

FIG. 7 is a view corresponding to FIG. 6, but showing the roller, complete with its underslung driving unit, lifted bodily (i.e., vertically) out and clear of its pillow-blocks;

FIG. 8 is a detail, drawn to a larger scale, of an end of one of the main stretching rollers showing one journal bearing in its housing and the construction of the underslung driving unit;

FIGS. 9 and 9A show a cross section and elevation respectively of the main rails and the vertically sliding bolts which serve to lock the carriages to the main rails;

Figure 7A:
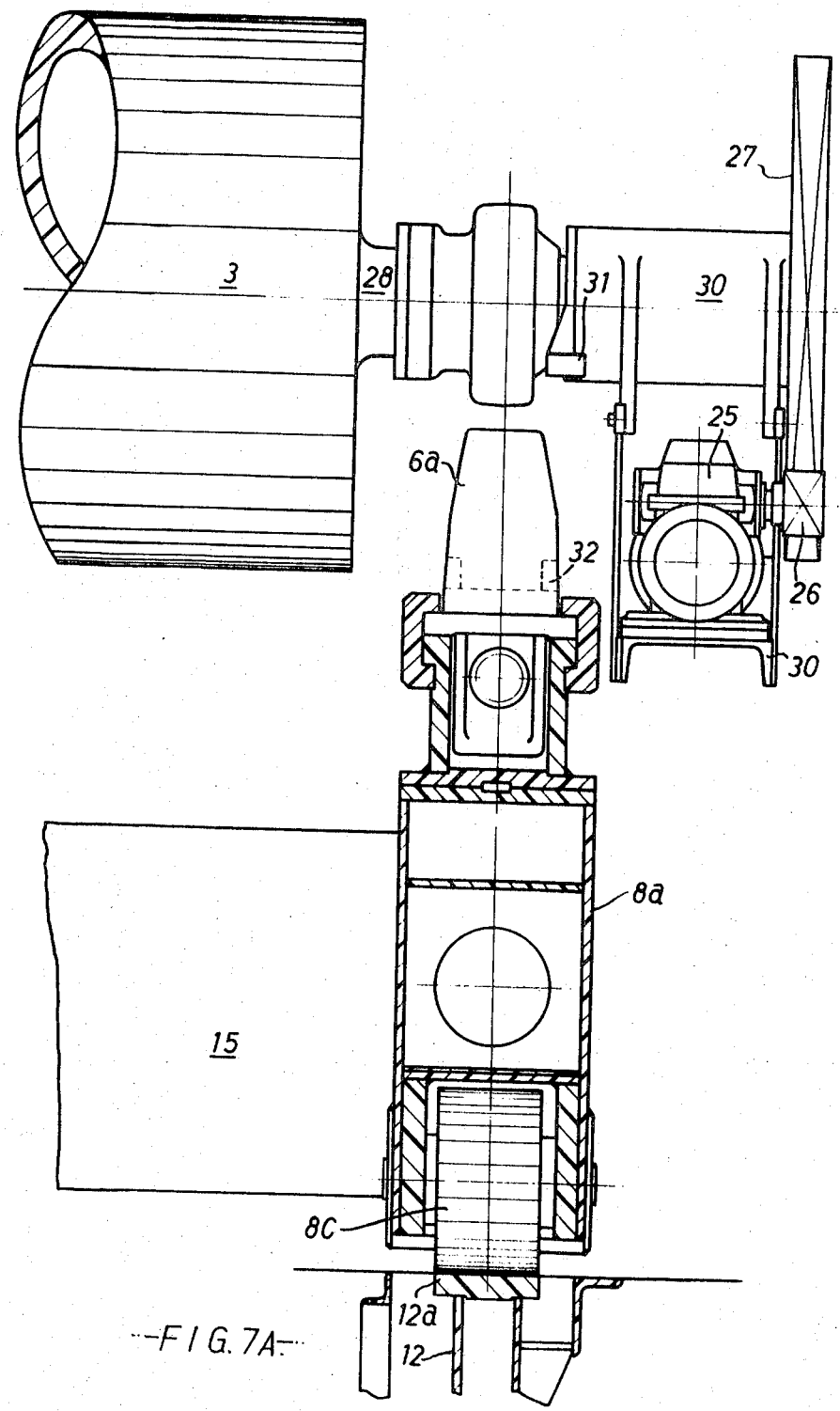
FIG. 7A is a rear elevation of the arrangement shown in FIG. 7.

FIGS. 10 and 10A show a cross section and elevation respectively of the main rails and the hook-bolts engaging them thereby serving to prevent the rear ends of the carriages from lifting, or tilting, under the couples created by the horizontal pull of the felt; and FIG. 11 is a plan of the preferred power-driven mechanism for travelling the main stretching roller along the slides provided on the mobile stretching carriage.

Referring now to the drawings, and particularly to FIGS. 1 and 1A, the endless felt, comprising its top run 1 and its bottom run 1a, envelops the two main rollers 2 and 3, between which the felt is extended under appropriate tension.

The first roller 2 is supported at each end in open-top pillow-blocks 4 and 4a, which are attached to, so as to form integral parts of, the twin carriages 5 and 5a. These are provided with wheels 5c, some of which may be flanged, adapted to run on the main rails 12, to which, however, the said twin carriages can be securely locked in the particular station in which they are shown in FIG. 1, to enable them to withstand the horizontal pull due to the tension developed in the felt. As the twin carriages 5 and 5a are not mutually supporting, an auxiliary rail 13 is provided in the floor adjacent to each main rail 12. As shown in FIGS. 4 and 4A, the cantilever arms 14, fixed to the inner vertical sides of the twin carriages, engage the rails 13 thereby ensuring that the twin carriages maintain their vertically erect position on the rails 12.

The second roller 3, as shown in FIGS. 1 and 1A, is likewise supported at each end in open-top pillow-blocks 6 and 6a, which in this case are slidably mounted on the mobile stretching carriage, such cariage comprising the side frames 8 and 8a mutually supporting by reason of the cross-framework 15 which ties them rigidly together. This carriage is similarly provided with wheels 8c adapted to run on the main rails 12.

To resist the horizontal pull, due to the tension developed in the felt, in the particular circumstances depicted in FIGS. 1 and 1A, the mobile stretching carriage can be securely locked to the main rails 12, but the said carriage is first moved out to a suitable distance away from roller 2, according to the length of each particular felt. Any convenient means of propulsion may be adopted for the mobile carriage. It may for instance, be towed in either direction by chains, or steel wire ropes, actuated by a manually or power-operated winch located at either end of the main rails 12, or the latter rails may be provided with toothed racks or tensioned roller chains, arranged to mesh with corresponding toothed wheels secured to shafts turning in bearings fixed to the carriage, such shafts being rotated in either direction as required, either manually or by power means. Such mechanism is not required to develop any appreciable tension in the felt, but merely to change the position of the mobile carriage along the rails as required from time to time.

The tops of the side frames 8 and 8a are formed into horizontal slides along which the pillow-blocks 6 and 6a are adapted to be propelled, in either dircetion but in strict unison, by power-operated screw and nut mechanism, or the equivalent, which is designed to apply any specific tension to the widest felt that can be accommodated on the machine. By these means, roller 3, while closely maintaining its parallelism with roller 2, may be travelled either away from or towards roller 2, within the physical limits imposed by the overall length of the side frames 8 and 8a.

Referring now particularly to FIGS. 10A and 11, the preferred mechanism for propelling the pillow-blocks 6 and 6a, and the roller 3 resting therein, is carried on the cross-framework 15, at a point 15a approximately midway between the side frames 8 and 8a. A reversible motor 33 drives tubular cross-shafts via a reduction gearing 34, bevel gears 36 at the outer ends of the said cross-shafts transferring the drive to short parallel shafts 37 and 37a. Spur pinions 38, 38a on the outer ends of the shafts 37, 37a mesh directly or indirectly with spur-gears 39 and 39a keyed to the outer ends of the long screws 40 and 40a. The screws 40, engage respective nuts 41 (not shown in FIGS. 10A and 11) mounted nonrotatably in the sliding pillow-blocks 6 and 6a.

The twin carriages 5 and 5a require to be securely locked to the rails 12 in the particular position shown in FIG. 1, for which purpose each such frame is provided with a vertically sliding bolt 20, which bolts are adapted, when lowered, to enter a pair of holes formed in the tops of rails 12. The mobile stretching carriage (8–15–8a) also requires to be securely locked to the rails 12, but at any suitable interval in their length, for which purpose each side frame is likewise provided with vertically sliding bolts 20. Referring to FIGS. 9 and 9A, the top flange plate 12a of each main rail 12 is provided with a series of circular holes 12h, accurately aligned and spaced at intervals of say three feet or one metre, as may be the more convenient. The vertical locking bolts 20 are preferably raised and lowered by compressed air actuator cylinders 20c. The lower ends 20t of the bolts 20 are tapered to facilitate their entry into the holes 12h. When the carriages are suitably positioned, the said bolts 20 may be lowered so as to enter the appropriate pairs of holes in the rails 12, by which means the carriages are securely locked to the rails and enabled to withstand the horizontal pull due to the tension developed in the felt.

It will be understood from FIG. 5 that the vertical bolts 20 and their actuator cylinders 20c are fitted to the front or adjacent end of the carriages 5–5a and 8–8a. When brought close together as shown in FIG. 5, the carriages may be temporarily coupled together by means of pins 22, whereby the twin carriages 5 and 5a, when so required, may be moved horizontally along the rails in concert with the mobile carriage 8–15–8a.

The rear or opposite ends of each carriage side frame (5, 5a, 6 and 6a) are provided with a pair of hook-bolts 42, adapted, as shown to a larger scale in FIG. 10 and 10A, to engage the underside edges of the top flange plates 12a of the main rails 12. These hook-bolts may be attached to the side frames in any convenient manner, as for instance, by parallel links 43 hinged at 43a, while the hook-bolts 42 are adjusted vertically by screwed extensions 44 to provide suitable working clearance between the hooks and the underside edges of the top plate 12a. These hook-bolts serve to prevent the rear, or outer, ends of the carriages from any significant lifting or tilting action under the couples created by the tension in the felt under the processing conditions shown in FIGS. 1 and 1A.

The two main rollers, 2 and 3, are each independently, but synchronously, rotated by their respective driving units 22 and 23, shown in FIGS. 1A, 2A, 3A and 4A, each of which, as shown to larger scale in FIGS. 6 and 6A, 7 and 7A and 8, comprises an electric motor with variable speed transmission 24, and suitable reduction gearing consisting of an enclosed worm-gear 25 and spur gears 26 and 27, the latter spur wheel 27 being fixed to the outer end of the extended roller shaft 28e. The frame 30 of each driving unit is underslung from its roller shaft 28, which is suitably extended at the rear, or nonloading, side of the machine, as shown at 28e in FIG. 8.

When the roller ends are resting in their respective pillow-blocks, as shown in FIGS. 1, 6 and 6A, the torque reaction of each driving unit is resisted by suitable lugs 31 engaging corresponding abutments 32 provided on the rear side frames 5a and 8a. When necessary, therefore, as shown by FIGS. 7 and 7A, as referred to later herein, the main rollers 2 and 3 may be lifted bodily (i.e., vertically) out of their respective open-top pillow-blocks, complete with their self-contained driving units.

Referring to FIGS. 1 and 1A, the upper heater box 10 may be permanently located above and in more or less vertical alignment with the lower heater box 11, and supported in any convenient manner. It is preferred, however, to carry the upper heater box on overhead runways 16, so as to allow it to be run back out of the way during the loading and unloading operations, and thereafter to be run forward to any suitable position, e.g., vertically over the lower heater box 11, or still further forward, in which last position the felt may be heated first on its lower side by the lower heater box 11, and thereafter heated on its upper side by the upper heater box 10, or by the two heaters simultaneously.

As the lower heater box 11 is inside the endless felt run, it is made mobile, for which purpose it is supported, at its extreme ends, on seatings provided on the twin carriages, 5 and 5a.

Electric current is conveyed to the upper and lower heater boxes by flexible cables, 10c and 11c fitted with detachable plug connectors. The resistive elements are preferably arranged in banks or sections of about 4 feet wide so that the side banks can be switched-off when processing narrow felts.

The surface temperature of the heating elements is preferably controlled in known manner so as to maintain any predetermined temperature within the permissible range.

The width of the lower heater box 11 determines the minimum centre distance of the two rollers, as seen in FIGS. 2, 3 and 4, and therefore the minimum length of endless felt that can be fitted thereon. Normally, the lower heater box is conveniently made about three feet wide. No such width restriction, however, applies to the upper heater box 10, which may contain two rows of heating elements, or alternatively two separate heating boxes, each independently supported on the overhead runway, may be provided, such additional top heater box being indicated in dotted lines at 10x.

As shown in FIGS. 1 and 1A, the two horizontal runs of the endless felt extending between the main rollers 2 and 3, are preferably supported by intermediate carrier rolls which prevent objectionable sag in the felt runs. The top run 1 may be supported by one or more carrier rolls 17 carried in radial bearings on portable A-frames 18, erected at any suitable position or positions along the main rails 12. The bottom run 2 may similarly be supported by one or more carrier rolls 19 carried in radial bearings which are raised to the necessary height by power-actuated means, but which, when not in use, sink into trenches in the floor, thereby enabling the mobile stretching carriage 8–15–8a to pass freely over them as and when necessary.

The twin overhead runways 17a, and the lifting blocks 17b adapted to travel along same, are provided for the express purpose of manipulating the portable A-frames 18 and the carrier rolls 17, in the manner later herein described. The front lifting block may also be used to assist in the operations of loading and unloading a "roped-up" felt.

When the finishing process has been completed with the various components in their relative positions shown in FIGS. 1 and 1A, the heating current is switched off, but the main rollers 2 and 3 are kept turning and the felt moving until the heater boxes and their elements have cooled down, which cooling process may be accelerated by fan draught. The rollers 2 and 3 may be cooled by cold water circulation as already described. The electric cables 11c to the lower heater box 11 are disconnected in preparation for unloading the finished felt.

With this specific object in view, the carrier roll 17 is lifted by the blocks 17b, and the portable A-frames removed, while the carrier rolls 19 are lowered into their trenches in the floor.

The roller 3 is first travelled in along its slides towards roller 2 in order to slacken off the felt, after which the vertical bolts 20 are pulled up out of the engaged holes in the rails 12, thereby unlocking the mobile carriage. This is then travelled in along rails 12 to the station shown in FIGS. 2 and 2A, and roller 3 is travelled further into the inner end of its slides. As these movements proceed, the felt is suitably "roped-up" (i.e., temporarily condensed in width by longitudinal folds) on the front ends of the rollers 2 and 3, and the slack gathered together on the floor underneath the final position of roller 3 shown in FIG. 2. The mobile carriage is thus brought to the station where, as shown in FIGS. 2 and 2A, it can be temporarily coupled to the twin carriages 5 and 5a, in the general manner and with the effect shown in FIG. 5, where pins 22 provide the necessary coupling effect.

The twin carriages 5 and 5a are then unlocked by pulling up their vertical bolts 20 clear of the rails 12, after which the mobile carriage (8–15–8a) is travelled out to the station shown by FIGS. 3 and 3A, taking along with it the twin carriages 5 and 5a, complete with roller 2 and the lower heater box 11 mounted thereon. It is with the carriages in this particular station that the next operations towards unloading the finished felt are carried out.

Referring to FIGS. 3 and 3A, the carrier roll 17, suspended on the lifting blocks 17b, still remains within the run of the endless felt, together with the rollers 2 and 3, and the lower heater box 11. (For the sake of clarity, the felt is not shown in FIGS. 2 and 3.)

The carrier roller 17 is first deposited in V-blocks 24 placed on the heater box 11 for that purpose, and the lifting blocks 17b are temporarily moved out of the way.

The scissors lift 25, which when not in action is arranged to retreat into a pit below floor level, is then brought into action. By means of shaped fixtures fitted at each end of its platen, it lifts rollers 2 and 3 bodily (i.e., vertically) out of their open-top pillow-blocks, 4, 4a and 5, 5a to the positions 2e and 3e shown by the dotted lines in FIG. 3, while the heater box 11, together with one or more carrier rolls 17 is carried in V-blocks 24 temporarily supported on the extreme ends of the said heater box, is correspondingly lifted to position 11e. The platen of the scissors lift extends in width over about the middle third of the length of the rollers 2 and 3, and equally of the heater box 11, and consequently about one-third of their length overhands the lifting platen at front and back, the said rollers and heater box remaining horizontal at all times.

Nevertheless, at this stage the front carriage frames 5 and 8 continue to obstruct easy removal of the endless felt, consequently the final operation consists of travelling the mobile carriage, 8–15–8a, together with the twin carriages 5 and 5a coupled thereto, out and away from the elevated rollers and heater box, as shown by FIGS. 4 and 4A. In this way perfectly clear access is provided to the overhanging front ends of the rollers 2 and 3 and heater box 11, from which, therefore, the endless felt can be unloaded without danger of damaging it.

The elevated rollers and heater box, once the carriages have been moved away as shown in FIG. 4, may be lowered by the scissors lift to any convenient height above the working floor level in order to facilitate the unloading and loading of the felts.

While as a matter of descriptive convenience the procedure of unloading an enless felt from the machine has been fully detailed, it will be apparent that the simple reversal of the described procedure will cover the loading of a subsequent felt in readiness for processing.

Thus, the felt is first draped, in "roped-up" formation, around the overhanging rollers and lower heater box, in the manner of FIG. 4, the coupled carriages are then travelled back under the rollers as shown in FIG. 3, after which the scissors lift is allowed to lower the two rollers into their respective pillow-blocks, and also to deposit the lower heater box on to its location seatings on the twin carriages.

At this stage, the lifting blocks are used to lift the carrier roll 17 clear of the heater box 11, from which the V-blocks 24 are also removed, after which the coupled carriages may be travelled in to the position shown by FIG. 2. At this point the vertical bolts 20 are lowered to lock the twin carriages 5 and 5a to the rails 12, and the electric cables 11c are reconnected to heater box 11.

Meanwhile, the coupling pins 22 (FIG. 5) are withdrawn, to enable the mobile stretching carriage to be moved out to a suitable distance according to the length of the felt, where the said carriage is locked by lowering its vertical bolts 20 to engage a suitable pair of holes in the main rails 12.

During these operations, the felt, which was fitted in "roped-up" condition for convenience of loading, is opened out to its full width on the rollers 2 and 3. The A-frame 18 may be erected at a suitable point, and the suspended carrier roll 17 deposited on the A-frame, so as to support the top run 1. Similarily, the carrier roll 19 may be raised to support the bottom felt run 2.

It remains only to travel out roller 3 along its slides as far as is necessary to develop the appropriate tension in the felt and to switch on one or both of the heater boxes 10 and 11, according to the particular process to be carried out.

The movement of the main roller 3 to and fro along its slides may be controlled automatically to maintain any specified tension in the felt.

The temperature attained by the surface of the felt emerging from between the two heater boxes is determined by the surface temperature of the heating elements and the speed of the moving felt. In general, the thicker the felt, the lower its speed should be in order to allow time for the heat to be conducted from the surface layers to the middle of the felt.

While the use of electrically-heated infrared elements is preferred, gas-heated elements may be used with similar effect.

While a scissors lift is preferred for the purpose described, any alternative form of lifting device may be used with corresponding effect.

What I claim is:

1. A machine for the finish processing of endless felt or like structure, comprising: first carriage means; fixed bearing means on said first carriage means, a first main roller rotatably mounted in said fixed bearing means, a second main roller arranged in spaced parallel disposition relative to said first main roller, second carriage means, mounting means on said second carriage means supporting said second main roller in such disposition on said second carriage means, said mounting means being adapted to be adjustable in position relative to said second carriage means so as to vary the separation of the first and second main rollers as required, track means supporting said first and second carriage means for movement relative to each other to and from a position of adjacency, and heater means adapted and arranged at a suitable location between the rollers to apply heat to both sides of the felt extending around and supported by first and second rollers.

2. A machine according to claim 1, wherein said second carriage means defines a mobile stretching carriage which includes spaced side members rigidly connected by a cross-frame work, and said first carriage means includes twin carriages arranged in spaced side-by-side disposition, and means adapted to couple the carriages together to effect horizontal movement of said carriages as a unit on said track means.

3. A machine according to claim 2, wherein the top faces of said side members are formed into slides supporting open-top pillow blocks to receive the second main roller, said pillow blocks being movable longitudinally in either direction along said slides, kinematic means including screw and nut mechanism coupled together, an electric motor for effecting said longitudinal movement, a means electronically controlling the motor to maintain any desired tension in the felt as it moves slowly while extended between the rollers.

4. A machine according to claim 1, wherein a vertically adjustable bolt is associated with each carriage means, each bolt being interengageable with one of a plurality of holes in the track means to fix the carriages longitudinally thereof.

5. A machine as claimed in claim 1 wherein hook bolts are provided at the rear ends of each carriage, which hook-bolts are adapted to engage the underside of top flanges of the track means, thereby preventing the rear ends of the carriages from any significant lifting or tilting action unnder the couple created by the tension of the felt.

6. A machine as claimed in claim 1 wherein each roller has a respective self-contained driving unit therefor, the said units being mounted with and being liftable with the related roller.

References Cited

UNITED STATES PATENTS

| | | | |
|---|---|---|---|
| 1,514,748 | 11/1924 | Wilson | 26—68 |
| 3,149,003 | 9/1964 | Christie et al. | 26—68X |
| 3,409,460 | 11/1968 | Mitchell et al. | 34—4X |

FOREIGN PATENTS

| | | | |
|---|---|---|---|
| 10,735 | 1899 | Great Britain | 34—152 |
| 11,738 | 1905 | Great Britain | 26—68 |

CARROLL B. DORITY, JR., Primary Examiner

U.S. Cl. X.R.

263—2; 34—152